(No Model.)
A. & J. BOLINGER.
AGE GAGE.
No. 493,963. Patented Mar. 21, 1893.
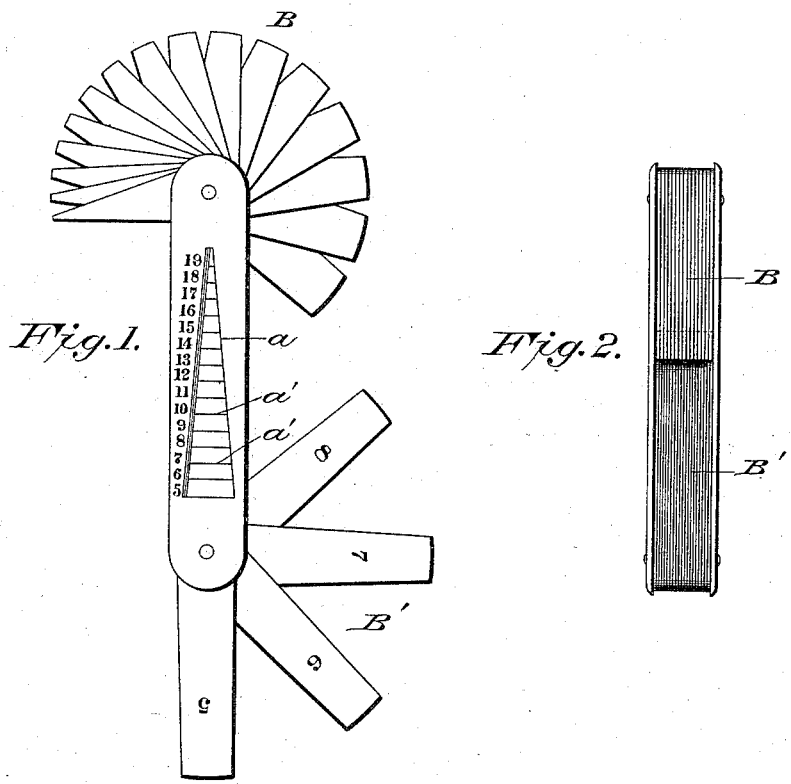
Witnesses
L. S. Elliott
E. M. Johnson
Andrew Bolinger
and
John Bolinger
Inventors
by
Attorney
THE NORRIS PETERS CO., PHOTO-LITHO., WASHINGTON, D. C.

UNITED STATES PATENT OFFICE.

ANDREW BOLINGER AND JOHN BOLINGER, OF SPEEDWELL, TENNESSEE.

AGE-GAGE.

SPECIFICATION forming part of Letters Patent No. 493,963, dated March 21, 1893.

Application filed December 8, 1892. Serial No. 454,511. (No model.)

*To all whom it may concern:*

Be it known that we, ANDREW BOLINGER and JOHN BOLINGER, citizens of the United States of America, residing at Speedwell, in the county of Claiborne and State of Tennessee, have invented certain new and useful Improvements in Gages for Determining the Age of Horses; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in gages for ascertaining the approximate age of horses, the same being designed more especially as an improvement upon Patent No. 478,560, dated July 12, 1892, issued to Andrew Bolinger; and our invention consists in providing two sets of gages which are connected to a handle so as to fold within the same, one set being adapted to be used for ascertaining the approximate age of horses of large size while the other is for horses of a smaller size, all as will be hereinafter fully set forth, and particularly pointed out in the claims.

In the accompanying drawings forming part of this specification, Figure 1 is a side view. Fig. 2 is a side view looking at the edge of the implement, and Fig. 3 is a sectional view.

The handle of the implement is made up of two plates, each one of which is provided with a scale $a$ consisting of longitudinal and transverse lines as shown, the longitudinal lines converging from one end of the implement to the other while the transverse lines, or gage-marks, $a'$, extend between said longitudinal lines and are of different length. The scale on one plate is of a different size than that on the other. Secured at each end of the handle by means of pivot-pins is a series of blades or gages B and B', the ends of which are of different widths, so that the cavity or discoloration in the horse's tooth can be measured and the approximate age of the animal determined by reference to the figures on the blade the end of which is as wide as the cavity or coloring. The blades or gages B instead of being pivoted to the handle may be connected thereto so that they can be removed when desired.

The advantages of having the scale or gage-marks on the handle is, that should for any reason any one or more of the blades or gages B have its end marred it may be corrected by filing or cutting the same away to match the corresponding gage-mark on the handle.

Having thus described our invention, what we claim as new, and desire to secure by Letters Patent, is—

1. In a device for ascertaining the approximate age of a horse, a handle consisting of two plates connected to each other, said handle having at each end a series of gage-plates and on each side a scale the gage-marks of which correspond with the width of the ends of the gage-plates, substantially as shown, and for the purpose set forth.

2. In a gage or device for ascertaining the approximate age of a horse, the combination of the plates A and A' having scales formed thereon, said scales consisting of lines which converge and transverse lines extending between the converging lines, the transverse lines decreasing in width progressively from end to end, together with a series of blades pivoted between the plates A and A', said blades having ends corresponding in width with the transverse gage-marks on the scales, substantially as set forth.

In testimony whereof we affix our signatures in presence of two witnesses.

ANDREW BOLINGER.
JOHN BOLINGER.

Witnesses:
H. M. SUMNER,
WM. NORTON.